April 27, 1954     G. L. OLSON     2,676,494
CHANGE-SPEED GEAR DEVICE
Filed Nov. 6, 1951     2 Sheets-Sheet 1
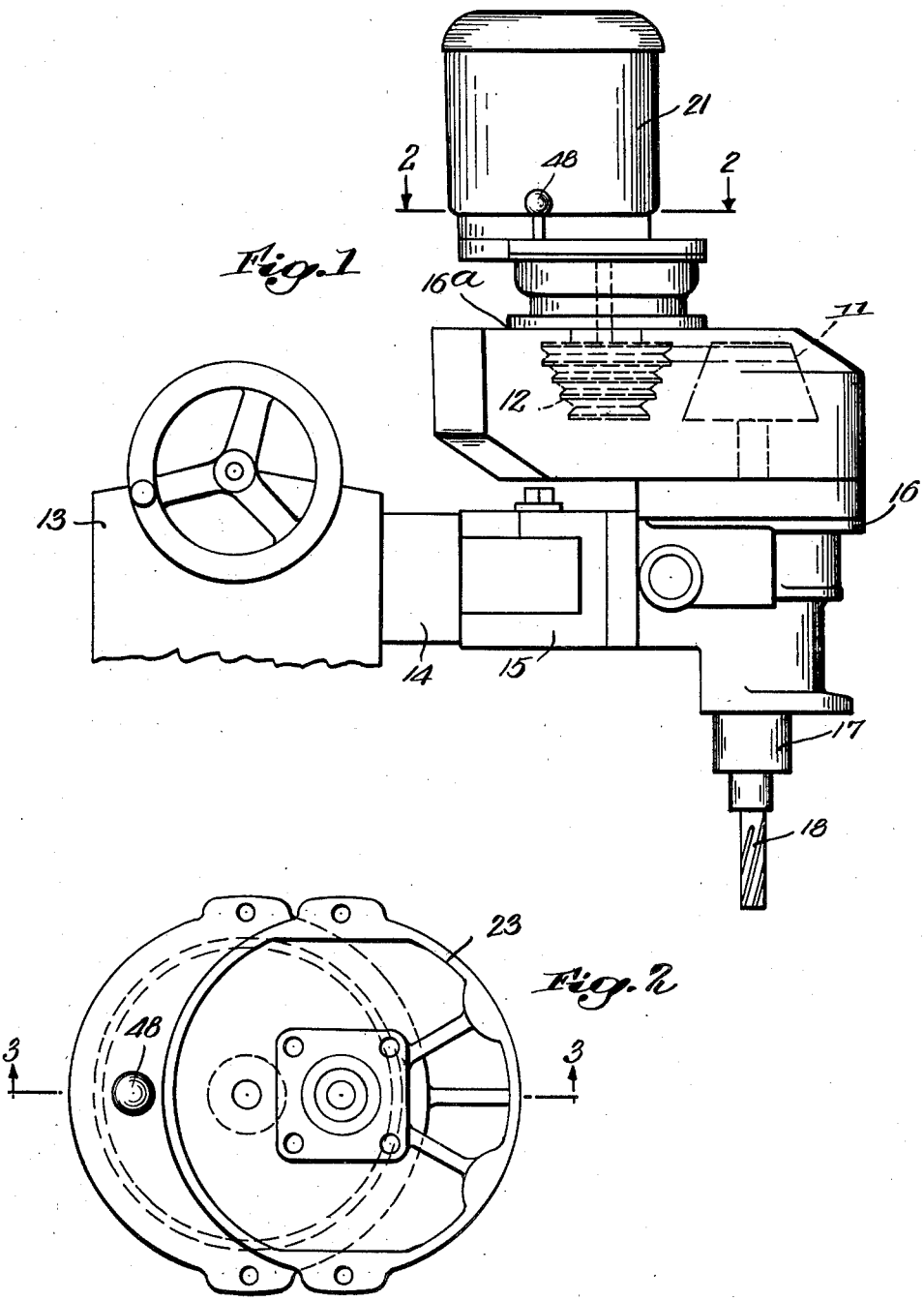

April 27, 1954  G. L. OLSON  2,676,494
CHANGE-SPEED GEAR DEVICE
Filed Nov. 6, 1951  2 Sheets-Sheet 2
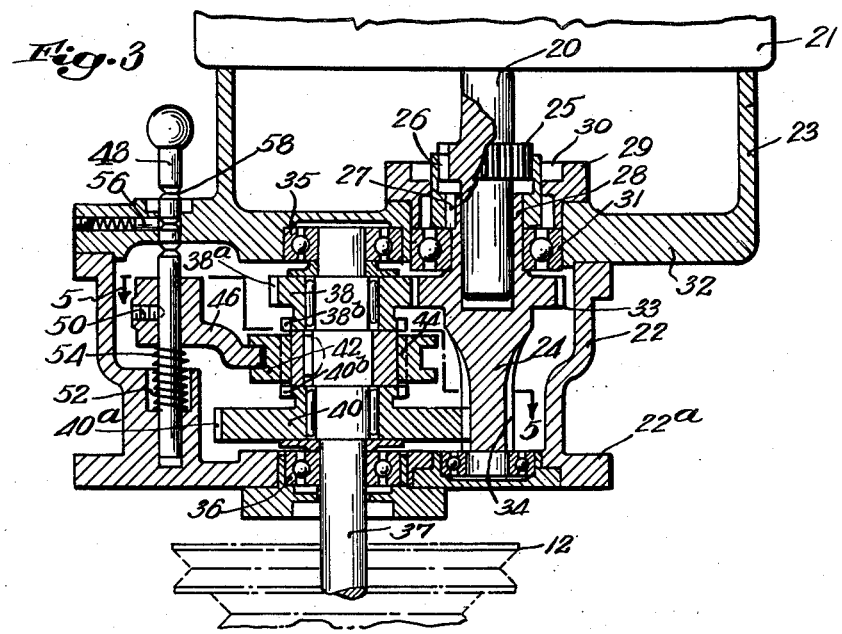
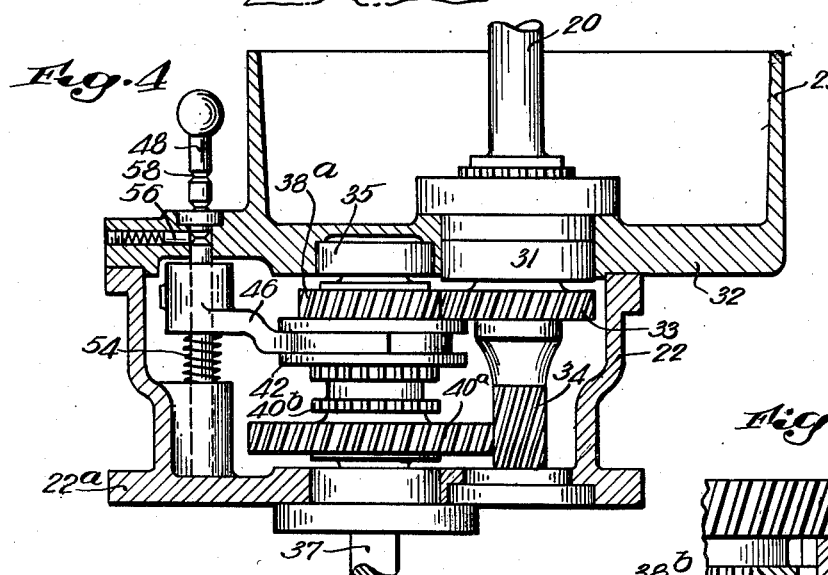
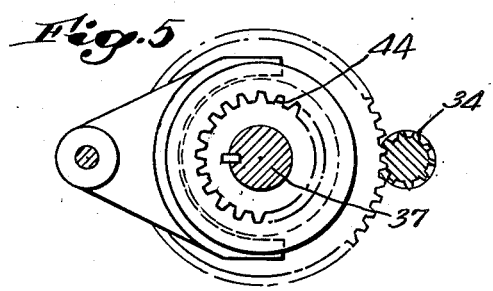
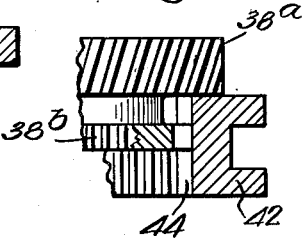
Inventor
Gordon L. Olson
by
Attorney Patented Apr. 27, 1954

2,676,494

UNITED STATES PATENT OFFICE 2,676,494

CHANGE-SPEED GEAR DEVICE

Gordon L. Olson, Arlington, Mass.

Application November 6, 1951, Serial No. 255,010

1 Claim. (Cl. 74—370)

This invention relates to machine tools and more particularly the present invention relates to an auxiliary change speed gear unit adapted to be associated with machine tools already in use and to provide additional speeds of the operating tool or cutter.

Many machine tools already in use, of which a milling machine may be cited as an example, are provided with a plurality of spindle speeds relative to the speed of the prime mover which, in general, consists of a motor directly mounted on the machine in accordance with the present practices of a most efficient arrangement. These present spindle speeds in many machines are of a predetermined step group and are relatively high so as to permit of a maximum production in a direct relation to the material being operated upon. Such spindles may be provided with a group of selective step speeds, for example, of 275, 425, 700, 1050, 2100 and 4250, and are generally obtained through a belt, or the like, that may be shifted to step pulleys of driving and driven elements associated with the motor prime mover and the machine spindle.

While such present spindle and operating tool speeds prove efficient, in many instances an additional group of lower speeds may be desirable to give more satisfactory results in a machine having a high range of speeds; or contra, a machine having a low range of speeds may be increased in efficiency with an additional range of higher speeds other than those originally embodied in the machine. Again, spindle speeds intermediate those originally embodied in the machine may be desirable for certain operations to meet special conditions, or for maximum efficiency.

Accordingly, one of the primary objects of the present invention is to provide a change speed gear unit that may be readily associated with the present driving motor of a machine, and its operating tool, to increase the number of step speeds at which the tool may be operated. Another object of the invention is to provide an auxiliary speed changing unit that may be associated with machines already in use to supplement the original speeds and to increase the range of speeds of the operating tool without a requirement for rebuilding the machine itself. Still another object of the invention is to provide an additional speed changing unit that will provide a machine tool with additional tool speeds without interfering with the size of the work that the machine is adapted to operate upon.

Finally, the invention is concerned also with the problem of difficulty in disengaging one set of gears from another as well as overcoming excessive frictional resistance in reengagement of gears, and the invention aims to devise a special combination of gears and gear shifting elements which will provide for smooth, easy interchanging of gears.

These and other objects and novel features will be more fully understood and appreciated from the following description of a preferred embodiment of the invention selected for purposes of illustration and shown in the accompanying drawings, in which Fig. 1 is a side elevation of a milling machine having the present invention embodied therein;

Fig. 2 is a plan view taken on the line 2—2 of Fig. 1;

Fig. 3 is a cross-section taken on the line 3—3 of Fig. 2, and showing the change speed gear unit of the invention in one position of adjustment;

Fig. 4 is a view similar to Fig. 3 but showing the change speed unit in a different position of adjustment;

Fig. 5 is a plan cross-section taken on the line 5—5 of Fig. 3; and

Fig. 6 is a detailed cross-sectional view showing the relative position assumed by the shifter element of the invention in one position of adjustment of the change speed unit.

In the structure shown in the drawings and, in particular, the parts shown in Fig. 1, numeral 13 denotes a turret head which may form a part of a conventional tool structure including a machine base, table, movable work support, and other elements commonly found in connection with turret head devices and not shown in the drawings. Generally indicated at 15 is a knee that connects the column 14 with a cutting tool and its driving attachment 16. The latter apparatus includes driving means, such as step or cone pulleys 11 and 12. The driving pulleys when operated from a source of power, hereinafter described, operate a spindle 17 in which may be mounted a cutting tool 18.

As is more clearly illustrated in Figs. 3 and 4 of the drawings, the pulley member 12 is driven by the improved speed changing mechanism of the invention comprising a housing 22 having a base 22a adapted to engage with, and be secured to, a face plate 16a of the spindle housing 16 above noted. A motor base 23 forms a wall of the housing 22 and may be adapted to receive and support a motor 21 with its axis of rotation vertically disposed in the present instance.

The motor shaft 20 extends through the motor base 23 and is secured in driving relation with respect to a multiple gear 24 by means of a coupling member 25 including a spur gear fixed to the shaft 20 and in meshing association with internally splined member 26 splined to the hub 28 of the multiple gear assembly 24. The internally splined member is secured by a key 27 to a hub portion 28 of the multiple gear 24 into which the lower extremity of shaft 20 extends, as shown in Fig. 3. The internally splined member 26 is enclosed in a bushing member 29 in which is located an oil seal 30, and at its bottom portion the internally splined member 26 rests upon an antifriction bearing 31. It will be noted that the internally splined member 26 when splined to the hub 28 forms an annular shoulder and between this annular shoulder and upper gear 33 is the annular recess in which the inner raceway of the upper bearing unit is located. The inner race of the bearing 31 is supported against the hub of the multiple gear 24 while the outer race of the bearing noted is contained in an annular opening formed in the removable head section 32 of the housing. The motor, through its shaft 20 and spur gear 25, drives the internally splined member 26 and the multiple gear to which the internally splined member is keyed.

The multiple gear 24 is formed with a relatively large helical gear portion 33 and a relatively small helical gear portion 34, as is more clearly shown in Fig. 5 of the drawings. Rotatably mounted in suitable antifriction bearings 35 and 36, and disposed within the housing 22 in a position parallel to the axis of the speed change gear 24, is a shaft 37 having an end portion extending outwardly beyond the flange portion 22a of the housing and adapted to have the step pulley 12 secured thereto, as suggested in Figs. 3 and 4 of the drawings. As noted above, it is intended that the step pulley 12 be previously secured to the motor shaft 37 and it is designed to coact with a step pulley 11 associated with the spindle 17 to rotate the cutting tool 18 at a limited number of different speeds.

Rotatably mounted on the shaft 37 in a spaced-apart relation to one another are gear clusters 38 and 40, of which gear 38 has relatively large helical gear teeth 38a and relatively small helical gear teeth 38b, while gear cluster 40 has relatively large helical gear teeth 40a and relatively small helical gear teeth 40b. The relatively large gear teeth 38a of gear cluster 38 are at all times in mesh with the helical teeth 33 of multiple gear 24 and, similarly, the relatively large gear teeth 40a of gear cluster 40 are always in mesh with the helical gear teeth 34 of multiple gear 24, with the result that when the motor is driving the gear 24 the two gear clusters are always rotating about the shaft 37, and the latter member is normally in an "at rest" position.

In order to drive the shaft 37 at some desired gear speed, I have provided a shifter 42 which is slidably keyed to the shaft 37 in the manner illustrated in Fig. 3 and which is further formed with an internal gear portion 44 also of helical conformation and adapted to selectively engage with either its coacting gear 38b of gear cluster 38 or, alternatively, its coacting gear portion 40b of gear cluster 40. As shown in Fig. 3, the shifter 42 is in a neutral position and therefore does not engage either one of the gear cluster portions 38b and 40b referred to. However, in Fig. 4 the shifter member has been illustrated in one position of engagement in which the shifter has its internal gear portion in mesh with the gear portion 38b of gear cluster 38.

It will be seen that with the relatively large gear teeth 38a of gear cluster 38 being driven by the gear teeth 33 through the motor 21, the engagement of the shifter member along the shaft 37 to which it is keyed will immediately bring the shaft into driving relationship at a speed which is determined by the respective gear ratios chosen in the system. Alternatively, changing the position of the shifter will cause the shaft to be brought into driving relationship with the gear cluster 40 to obtain a change in speed, depending upon the gear ratios in effect between the large gear teeth 40a of gear cluster 40 and the small gear teeth 34 of multiple gear 24.

The internal gear portion of the shifter 42 is of helical conformation to coincide with the helical gear portions 38b and 40b and therefore initial engagement is greatly simplified and a much quieter and easier operation is realized. Further cooperating with the helical gear arrangement described is a spring-held shifter operating member 46 preferably consisting of a yoke which is adapted to straddle the shifter member 42 at two sides of an annular groove formed at the outer periphery of the shifter member, as more clearly shown in Fig. 3. In accordance with the invention I provide the shifter operating member with a body portion which is secured to an adjusting rod 48 by means of a set screw 50. Located in a suitable recess 52 in the housing body is a coiled spring 54 which normally acts to resiliently urge the shifter operating member 46 into a raised position, as viewed in Fig. 3.

The upper section of the adjusting rod 48 is formed with a detent mechanism consisting of a spring-held plunger 56 which yieldably presses against spaced-apart V-shaped grooves 58 formed in the rod member. The action of the spring member in this particular arrangement operates to facilitate lifting of the shifter operating rod, partly overcoming gravity effects and the weight of the gear parts involved in the change speed gear mechanism. With the aid of this improved shifter mechanism it becomes possible to quickly, easily, and silently change gears for many types of tools of the character noted and the value and desirability of the change speed gear unit is very greatly enhanced.

It will be apparent that by selecting desired gear ratios in the two sets of driving gears described, a wide range of cutting tool speeds may be obtained, and in conjunction with a step pulley arrangement such as that described and shown in the drawings this range of speeds is extended to provide a very desirable flexibility in the operating and performance characteristics of the tool.

This application is a continuation-in-part of application Serial No. 239,036 filed July 28, 1951, now abandoned.

While the form and arrangement of parts shown in the drawings and above described constitute a preferred embodiment of the invention, it should be understood that I am not limited to the specific form and arrangement noted, it being understood also that various changes and modifications may be resorted to in keeping with the spirit of the invention as defined by the appended claim.

I claim:

A change speed gear unit including a housing, said housing including an upper wall formed with an opening, an outwardly projecting flange extending from said upper wall and about said opening to form a motor support, a motor disposed on said support with its shaft having its lower end extending into said housing through said opening, a gear fixed on said shaft, said gear being spaced from the lower end thereof, a multiple gear including spaced apart helical gears, said multiple gear being mounted in said housing and including a hub extension formed with a bore for receiving the end of said motor shaft, splines formed at the outer end of said hub and spaced from the adjacent gear of said multiple gear, means forming a driving coupling between said motor shaft and said multiple gear, said means including a member provided with an internal gear at one end for meshing with the gear on said motor shaft and internal splines at the other end, said internal splines engaging the splines at the end of the multiple gear hub and said splined end defining with the adjacent gear an annular recess, a bearing arranged in said annular recess, a second shaft rotatably mounted in bearings in said housing, said second shaft being spaced laterally from said multiple gear and having its axis parallel with the axis of the multiple gear, an end portion of said second shaft extending beyond the housing in position to support a stepped pulley thereon, internal gear clusters rotatably mounted on said second shaft and arranged in spaced relation thereon, a shifter element slidably keyed to said second shaft at a point between said gear clusters, said shifter element being constructed with an internal gear portion for engaging an adjacent gear of each cluster, a shifter operating means for selectively engaging the internal gear of said shifter element with the adjacent coacting gear of each of said gear clusters, said shifter operating means including a rod slidably disposed in said housing and having its upper end portion extending through the upper housing wall, the lower end of said rod being slidably positioned in a recess formed in said housing, spring means cooperating with said shifter operating means and rod to facilitate manual adjustment of the rod, said spring being received in a recess formed in the housing concentrically of the recess receiving the lower end of said rod and being connected at one end to said rod in a position to resiliently urge the shifter operating means outwardly of the housing, a plurality of recesses formed in said rod, and spring urged pin means engaging the recesses in said rod to retain the same in adjusted position.

References Cited in the file of this patent

UNITED STATES PATENTS

| Number | Name | Date |
|---|---|---|
| 1,762,178 | Lear | June 10, 1930 |
| 2,078,859 | Lapham | Apr. 27, 1937 |
| 2,187,614 | Ormsby | Jan. 16, 1940 |
| 2,188,403 | Frisby | Jan. 30, 1940 |
| 2,534,509 | Franck | Dec. 19, 1950 |